United States Patent
Sijbers et al.

(10) Patent No.: US 7,224,793 B1
(45) Date of Patent: May 29, 2007

(54) COMMUNICATION SET WITH DETECTION OF SET FUNCTION AND LINE CONDITION

(75) Inventors: Peter J. M. Sijbers; Franciscus J. M. Thus; Laurens C. Van Leeuwen, all of Eindhoven (NL)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/395,011

(22) Filed: Sep. 13, 1999

(30) Foreign Application Priority Data

Sep. 17, 1998 (EP) .......................................... 98203102

(51) Int. Cl.
| H04M 3/00 | (2006.01) |
| H04M 1/24 | (2006.01) |
| H04M 3/08 | (2006.01) |
| H04M 3/22 | (2006.01) |
| H04M 13/00 | (2006.01) |

(52) U.S. Cl. .................... 379/377; 379/24; 379/182; 379/409

(58) Field of Classification Search ........... 379/1, 379/21, 22, 34, 372, 373, 377, 399, 93.09, 379/177, 182, 199, 402, 380, 409
See application file for complete search history.

(56) References Cited

U.S. PATENT DOCUMENTS

| 4,368,358 | A | * | 1/1983 | Herschtal | 379/177 |
| 4,445,003 | A | * | 4/1984 | Alderman | 379/399 |
| 4,546,214 | A | * | 10/1985 | Laing | 379/93.09 |
| 4,899,372 | A | * | 2/1990 | Wahi et al. | 379/168 |
| 5,187,736 | A | * | 2/1993 | Morizumi | 379/100 |
| 5,291,545 | A | * | 3/1994 | Stahl | 379/377 |
| 5,388,153 | A | * | 2/1995 | Burger et al. | 379/156 |
| 5,414,764 | A | * | 5/1995 | Watanable et al. | 379/377 |
| 5,521,974 | A | * | 5/1996 | Hayashi et al. | 379/133 |
| 5,533,117 | A | * | 7/1996 | Kim | 379/164 |
| 5,675,640 | A | * | 10/1997 | Tappert et al. | 379/373 |
| 5,727,056 | A | * | 3/1998 | Lee | 379/399 |
| 5,742,671 | A | | 4/1998 | Parkerson et al. | 379/156 |
| 5,838,778 | A | * | 11/1998 | Jung | 379/182 |
| 6,160,884 | A | * | 12/2000 | Davis | 379/373 |

FOREIGN PATENT DOCUMENTS

| EP | 0617533 A2 | 9/1984 |
| GB | 2303022 | 2/1997 |

* cited by examiner

*Primary Examiner*—Binh Tieu

(57) ABSTRACT

A description is given of a communication set for connection to a communication line such as a telephone line, which communication set includes means for detecting set functions such as ringing signal detection, and a rectifier circuit which is connected to a common output which is coupled to a scanning device included in the set function detection means, which scanning device detects the line conditions. A large number of line conditions may be detected with a minimum of components required, among which an analog/digital converter for which only a single input pin on a chip is necessary.

16 Claims, 1 Drawing Sheet

COMMUNICATION SET WITH DETECTION OF SET FUNCTION AND LINE CONDITION

BACKGROUND OF THE INVENTION

1. Field of the Invention

The present invention relates to a communication set for connection to a communication line such as a telephone line, the communication set comprising line condition detection means and a rectifier circuit.

2. Description of the Related Art

A communication set of this type generally forming part of a telephone set is known from Philips Semiconductors User Manual ETT/AN93017. The known communication set is suitable for connection to a telephone line and comprises means for detecting so-called communication line conditions, among which the function of ringing signal detection by which the communication set detects whether a ringing signal is present on the telephone line by measuring a voltage on the telephone line. If a ringing signal is present, a sound source is activated which makes it clear to the subscriber that somebody tries to call him/her. Such a communication set also includes a rectifier circuit for providing in general that an internal supply voltage is derived from the voltage on the telephone line.

It is a drawback of the known communication set that the means for detecting the communication line conditions proportionally need a large number of hardware components and elements for detecting a number of line conditions that is often limited.

BRIEF SUMMARY OF THE INVENTION

It is an object of the invention to provide an improved communication set in which the number of hardware components and elements necessary for detecting the set functions is reduced and nevertheless the number of possible set functions to be detected is enlarged.

For this purpose, the communication set according to the invention is characterized in that an output of the rectifier circuit is coupled to a common scanning device included in the detection means for detecting the line conditions.

The advantage of the communication set according to the invention is that the connection of the common scanning device to the output of the rectifier circuit creates the possibility of a substantially direct coupling with a minimum number of connections necessary between the telephone line and the scanning device, as a result of which the number of components required for line condition detection diminishes considerably, whereas both the transfer of AC and DC information from the telephone line to the scanning device remains unaffected, which further just causes an increase of the number of communication line conditions to be detected by the scanning device. Moreover, the use of a multiplexer in the communication set according to the invention is not necessary, but possible indeed for the case where there is a desire to increase the number of set functions.

An embodiment of the communication set according to the invention is characterized in that the high-impedance output of the rectifier is coupled to the scanning device, which is advantageous in that there is a considerable degree of insulation between the telephone line on the one hand, and the major part of the communication set on the other hand, which causes the mutual interference to diminish.

A further embodiment of the communication set according to the invention is characterized in that a scanning device detects the set functions on the basis of a voltage found on the output of the rectifier. Line condition detection may thus simply be realized by measuring the voltage on the output of the rectifier.

Another embodiment of the communication set according to the invention is characterized in that between a first input of the set and the output and between a second input of the set and the output a semiconductor transition is present which minimizes the number of components required.

A still further embodiment of the communication set according to the invention is characterized in that the scanning device includes an analog/digital converter which advantageously converts the common-output voltage to be measured into a digital information signal that can be used directly in the communication set, and which converter can furthermore be simply integrated into a chip.

Advantageously, in an alternative embodiment of the communication set according to the invention, the analog/digital converter has an input and the communication set includes a high-impedance voltage divider which has a junction, which voltage divider is connected between the output of the rectifier and a point of common supply potential, the junction of the voltage divider being connected to the input of the analog/digital converter. This renders the communication set suitable for flexibly detecting in an adjustable manner a large number of set functions and/or telephone line conditions which may be different for each country, which detection, however, needs only a single chip pin as an asymmetrical input to the converter. In this respect one may think of ringing signal detection, image frequency detection, telephone-line-in-use detection, hold release function, parallel set detection, polarity reversal, busy signal detection, and so on and so forth.

In a further alternative embodiment of the communication set according to the invention, characterized in that the communication set includes a series combination of a resistor and an ON/OFF-hook switch connected to the voltage divider junction, still more set and/or line functions and conditions may be detected depending on the ON/OFF-hook condition.

In a preferred embodiment of the communication set according to the invention, this set includes a 6, 7 or 8-bits analog/digital converter, which is relatively simple to realize, by which a variety of set and/or line functions may be detected.

BRIEF DESCRIPTION OF THE DRAWINGS

These and other aspects of the invention will be apparent from and elucidated with reference to the embodiments described hereinafter.

In the drawings.

DETAILED DESCRIPTION OF THE INVENTION

Figure 1:
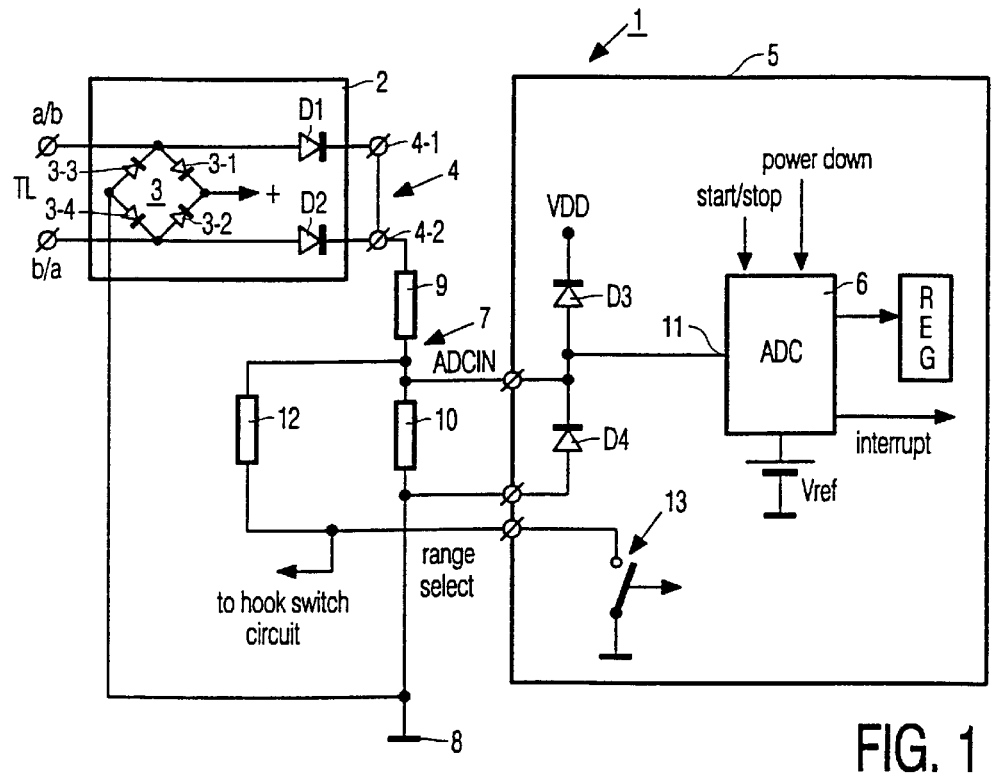
FIG. 1 shows a first embodiment of the communication set according to the invention.

FIG. 1 shows a communication set 1 forming part of, for example, a telephone set which has current communication line connecting terminals a/b and b/a which are coupled to a telecommunication network (not shown). The communication set 1 includes a rectifier circuit 2 connected to the communication line arranged as a telephone line TL, which rectifier circuit includes not only a two-phase diode bridge circuit 3 having bridge diodes 3-1, . . . 3-4 switched in forward direction, but also two semiconductor transitions arranged as diodes D1 and D2 which are both connected in parallel and in forward direction relative to the telephone line TL. The rectifier circuit 2 has interconnected output terminals 4-1 and 4-2, which form the output 4 of the rectifier. The communication set 1 includes means coupled to the output 4 which means are used for detecting communication line conditions and are arranged as a scanning device 5 with an analog/digital converter (ADC) 6. The communication set 1 further includes a preferably high-impedance voltage divider 7 which is connected to the common output 4 and a ground point 8 of a supply voltage of the communication set 1. The voltage divider 7 includes two high-impedance resistors 9 and 10 of 27 M and 2.6 M respectively, connected in series. A junction ACDIN of the resistors 9 and 10 forms input 11 of the analog/digital converter 6. Diodes D3 and D4 are internal protective diodes connected to the supply voltage VDD.

Figure 2:
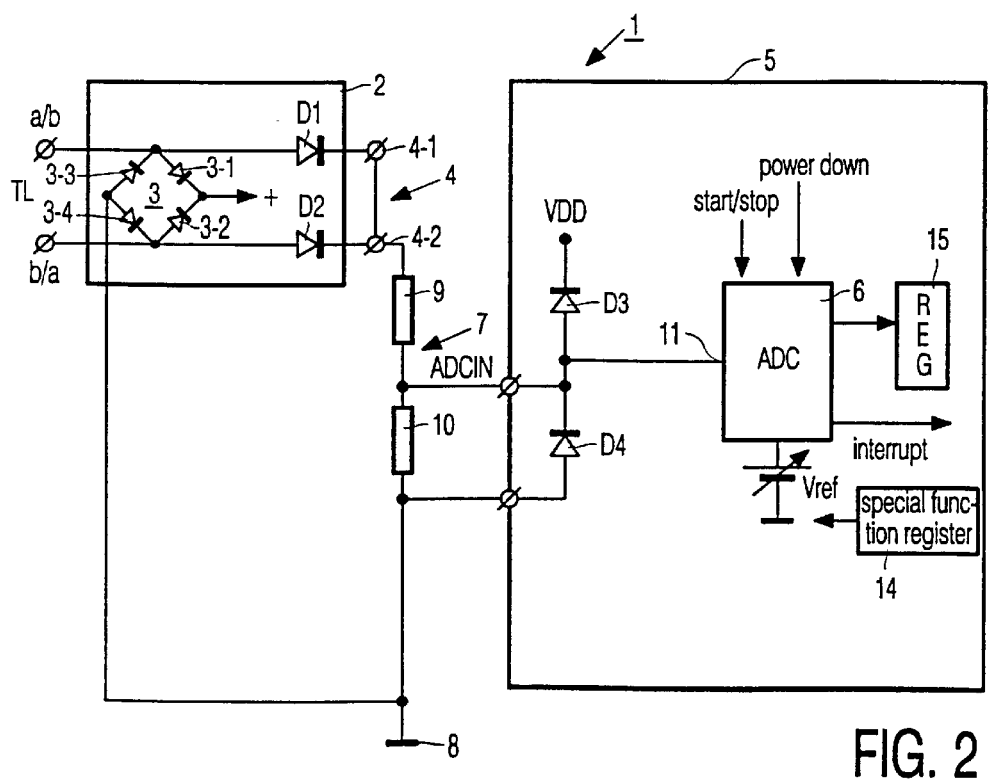
FIG. 2 shows a second embodiment of the communication set according to the invention.

Contrary to the embodiment of the communication set 1 shown in FIG. 2, the embodiment shown in FIG. 1 includes an additional resistor 12 connected to the junction ADCIN, which additional resistor 12 is connected to a switch 13 leading to the ground point 8, which switch 13 is closed/open respectively, in dependence on the ON/OFF-hook condition of a receiver of the telephone set.

Both embodiments of the communication set 1 shown in FIGS. 1 and 2 can be used for detecting various line conditions. The operation of the communication set 1 is then that at the instruction of a microprocessor (not shown) the ADC 6, which in practice may be, for example, an ADC having a resolution of 6, 7 or 8 bits, scans and measures the voltage on the common output 4, for example, every 5 seconds. Based hereon, for example the following set functions may be detected:

a) Ringing signal detection. Switch 13 is closed then (ON-hook). In the embodiment of FIG. 1, additional resistor 12 is then connected in parallel with the resistor 10 and the input signal on input 11 of the ADC 6 is extra attenuated, for example 80 times if the additional resistor 12 has a resistance 390 K. In the embodiment of FIG. 2 the ringing signal, assumed to have the above resistance values, is transferred to the ADC 6 in a less attenuated form.

b) Hold release function/parallel set detection. A subscriber is put on hold then / it is detected that two telephone sets or a telephone set and an answering machine are connected in parallel.

Based on the voltage on common output 5 measured by the ADC 6, several conditions may be detected. By making a reference voltage source $V_{ref}$ connected to the ADC 6 internally programmable in the embodiment of FIG. 2 by means of, for example, a special function register 14, the input range of the ADC 6 may be affected. The off-chip attenuator circuit of FIG. 1 which includes resistor 12 is then no longer necessary. Whereas the input range has been changed, the resolution continues to be acceptable given the practical 6–8 bits of the ADC 6. Usually, the 6–8 bits of the ADC 6 are sufficient. Obviously, depending on the functionality desired, another resolution of the ADC may be chosen.

Further telephone line conditions which may be detected, for example, by the 8-bits ADC 6 are telephone-line-in-use function, polarity reversal (only necessary for British Telecom), busy signal detection, caller identification, and so on and so forth. After the respect set function or line condition has been detected, a register 15 connected, for example,to the ADC 6 is driven, or an interrupt is generated to further process and use the information found.

What is claimed is:

1. A communication set for connection to a communication line, the communication set comprising:
    a line condition detection means and a rectifier circuit, an output of the rectifier circuit being coupled by a resistive attenuation means to a common scanning device included in the detection means for detecting line conditions; and
    an ON/OFF-hook detection means further comprising a series combination of a switch and a resistor coupled to the resistive attenuation means, the switch being closed at an ON-hook condition thereby affecting through the resistor attenuation of the resistive attenuation means.

2. A communication set as claimed in claim 1, wherein, through its high output impedance, the rectifier is coupled to the common scanning device.

3. A communication set as claimed in claim 1, wherein the common scanning device is configured to detect the line conditions on the basis of a voltage at the output of the rectifier.

4. A communication set as claimed in claim 3, wherein a first one-way semiconducting device is coupled between a first input of the set and the output, and a second one-way semiconducting device is coupled between a second input of the set and the output.

5. A communication set as claimed in claim 1, wherein the scanning device includes an analog/digital converter.

6. A communication set as claimed in claim 5, wherein the communication set includes a high-impedance voltage divider which has a junction, which voltage divider is connected between the output of the rectifier and a point of common supply potential, the junction of the voltage divider being connected to an input of the analog/digital converter.

7. A communications set as claimed in claim 1, wherein the analog/digital converter is a 6, 7, or 8-bits converter.

8. A communications set as claimed in claim 1, wherein the communications set is a telephone set.

9. A communication set as claimed in claim 5, wherein an input range of the analog-to-digital converter is controlled by an output of a special-function register means.

10. A communication set as claimed in claim 9, wherein the special-function register means comprises a data register for holding alternative sets of reference signals for input to the ADC.

11. A communication set as claimed in claim 9, wherein the special-function register means comprises a means for generating an interrupt to a processor.

12. A communication set for connection to a communication line, the communication set comprising:
    a rectifier circuit;
    a line condition detector including an analog-to-digital converter for scanning and measuring line conditions at the communication line, and a register for controlling an input range of the analog-to-digital converter, an input of the analog-to-digital converter being coupled to an output of the rectifier circuit.

13. A communication set as claimed in claim 12, wherein the line condition detector is configured to periodically scan the line conditions.

14. A communication set as claimed in claim 12, wherein the input of the analog-to-digital converter is coupled to the output of the rectifier circuit via a junction at a series connection of at least two passive elements, which series connection of at east two passive elements operates as an attenuator.

15. A communication set as claimed in claim 14, wherein the two passive elements are resistive elements.

16. A communication set as claimed in claim 12, wherein the register is configured to hold alternative sets of reference signals for input to the analog-to-digital converter.

* * * * *